(12) United States Patent
Dragan et al.

(10) Patent No.: US 11,420,717 B2
(45) Date of Patent: Aug. 23, 2022

(54) WATERCRAFT PROPULSION AND TRANSPORTATION MECHANISM

(71) Applicant: Toyota Motor Engineering & Manufacturing North America, Inc., Plano, TX (US)

(72) Inventors: Christopher E. Dragan, Canton, MI (US); Travis M. Blais, Ann Arbor, MI (US); Angela Piculi, Novi, MI (US); Philip J. Babian, Canton, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 389 days.

(21) Appl. No.: 16/692,057

(22) Filed: Nov. 22, 2019

(65) Prior Publication Data
US 2021/0155331 A1    May 27, 2021

(51) Int. Cl.
*B63H 16/04*      (2006.01)
*B60F 3/00*      (2006.01)

(52) U.S. Cl.
CPC ........... *B63H 16/04* (2013.01); *B60F 3/0007* (2013.01)

(58) Field of Classification Search
CPC .............. B63H 16/04; B63H 2016/043; B63H 2016/046; B60F 3/0007
See application file for complete search history.

(56) References Cited

U.S. PATENT DOCUMENTS

| | | | |
|---|---|---|---|
| 3,159,410 A | 12/1964 | Raymond | |
| 4,236,267 A | 12/1980 | Lewis et al. | |
| 4,579,357 A * | 4/1986 | Webster | B63C 13/00 114/344 |
| 5,261,680 A | 11/1993 | Freitus et al. | |
| 6,446,570 B1 * | 9/2002 | Johnson | B63C 13/00 114/344 |
| 8,684,778 B1 * | 4/2014 | Bergman | B63H 16/04 440/102 |
| 2006/0186635 A1 | 8/2006 | Stewart | |
| 2010/0204020 A1 | 8/2010 | Thomas et al. | |
| 2011/0011432 A1 * | 1/2011 | Yakos | A45B 9/04 135/77 |

* cited by examiner

*Primary Examiner* — Jacob M Amick
(74) *Attorney, Agent, or Firm* — Christopher G. Darrow; Darrow Mustafa PC

(57) ABSTRACT

An oar for use in propelling a watercraft through water includes a first circular paddle portion. An edge hole extends into an edge of the first paddle portion. The oar also includes a second circular paddle portion, with an edge hole extending into an edge of the second paddle portion. The oar also includes a handle portion having a first end and a second end opposite the first end. The first paddle portion edge hole and the handle portion first end are structured so that the handle portion first end is detachably securable in the first paddle portion edge hole. The second paddle portion edge hole and the handle portion second end are structured so that the handle portion second end is detachably securable in the second paddle portion edge hole.

5 Claims, 3 Drawing Sheets

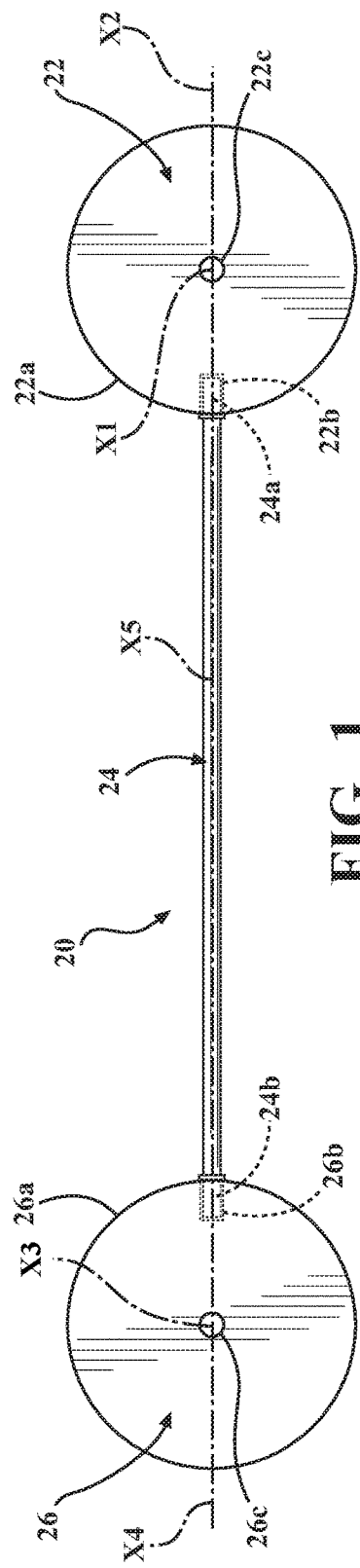
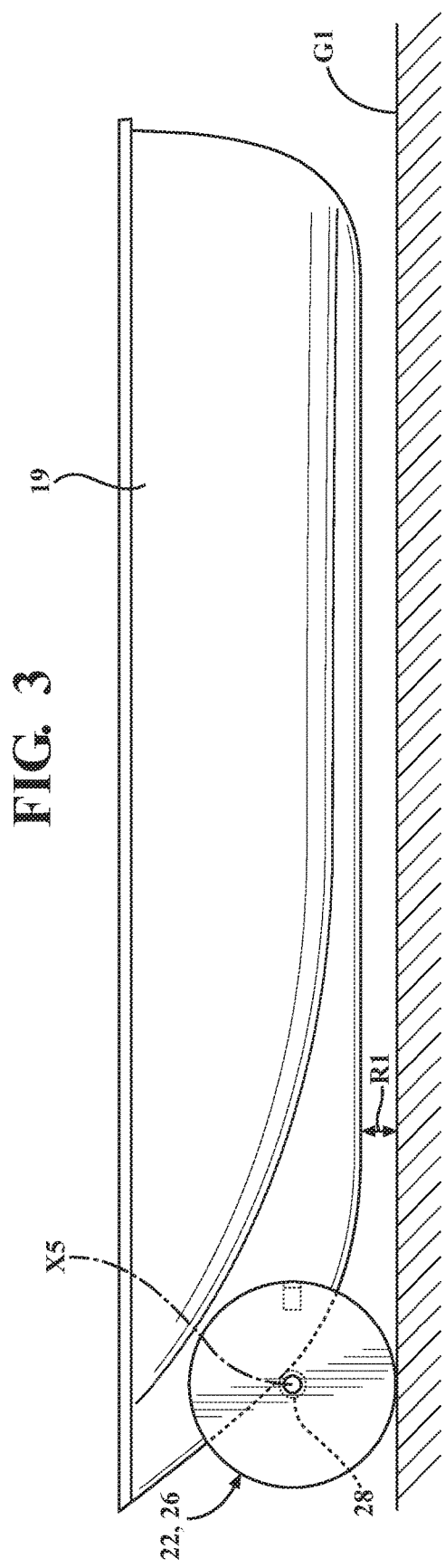

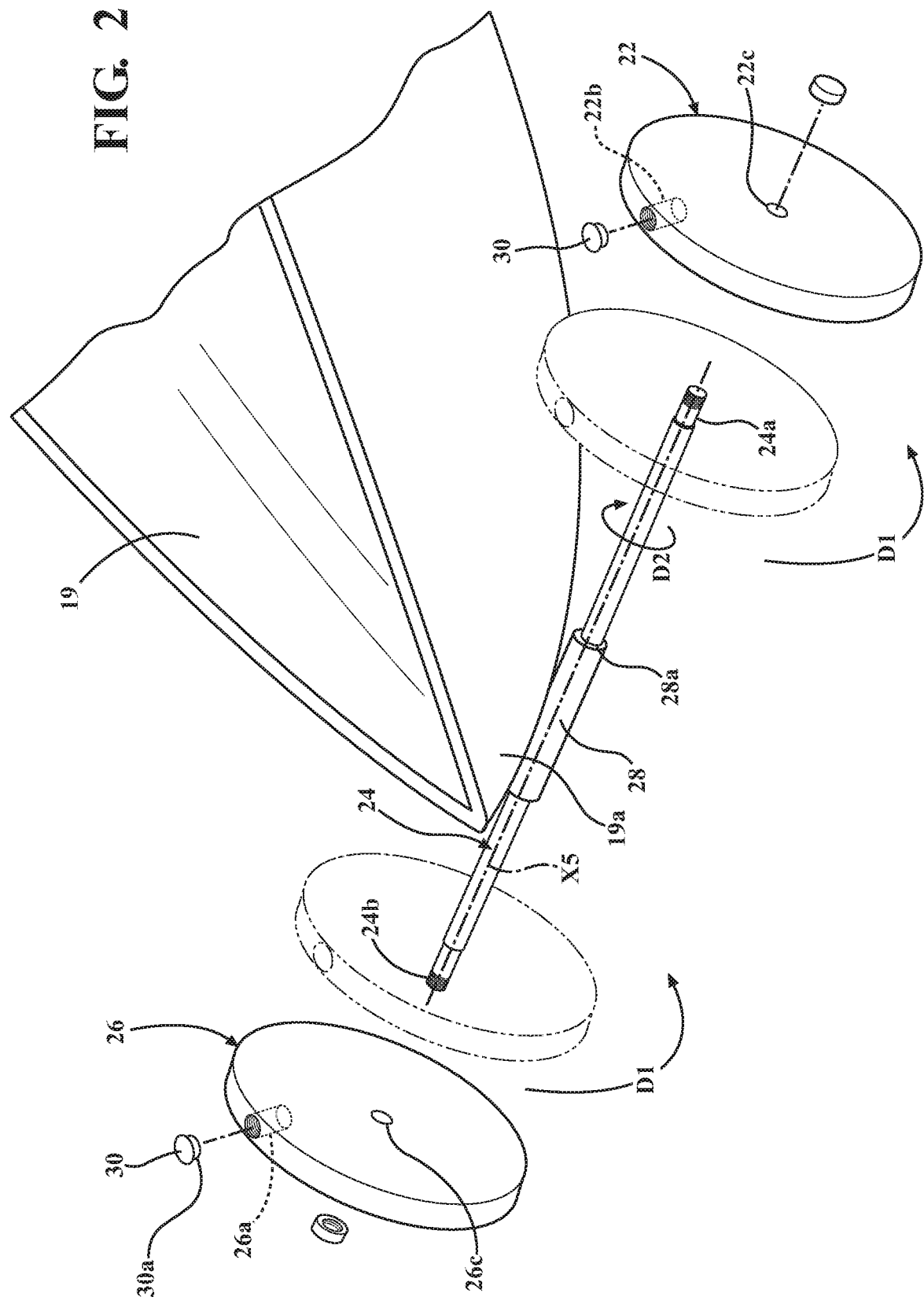

WATERCRAFT PROPULSION AND TRANSPORTATION MECHANISM

TECHNICAL FIELD

The present invention relates to vehicle accessories and, more particularly, to an accessory for a recreational watercraft which serves as both a propulsion device and a transportation mechanism.

BACKGROUND

Users of recreational watercraft such as canoes and kayaks sometimes need to transport the watercraft over a ground surface. However, such watercraft are frequently heavy and/or bulky. Thus, to transport the watercraft, it may be necessary to seek the help of another user to carry the watercraft or drag the watercraft across the ground, thereby risking damage to the watercraft.

SUMMARY

In one aspect of the embodiments described herein, an oar is provided for use in propelling a watercraft through water. The oar includes a first circular paddle portion. An edge hole extends into an edge of the first paddle portion. The oar also includes a second circular paddle portion, with an edge hole extending into an edge of the second paddle portion. The oar also includes a handle portion having a first end and a second end opposite the first end. The first paddle portion edge hole and the handle portion first end are structured so that the handle portion first end is detachably securable in the first paddle portion edge hole. The second paddle portion edge hole and the handle portion second end are structured so that the handle portion second end is detachably securable in the second paddle portion edge hole.

BRIEF DESCRIPTION OF THE DRAWINGS

The accompanying drawings, which are incorporated in and constitute a part of this specification, illustrate embodiments described herein and together with the description serve to explain principles of embodiments described herein.

FIG. 1 is a schematic side view of an oar in accordance with an embodiment described herein.

FIG. 2 is a schematic perspective exploded view of the oar of FIG. 1 showing reconfiguration of the oar to an axle and wheels which may be rotatably coupled or secured to the watercraft to enable the watercraft to be rolled across a ground surface.

FIG. 3 is a schematic side view of an oar reconfigured and attached to a watercraft, to aid a user in transporting the watercraft across a ground surface.

DETAILED DESCRIPTION

Figure 4:
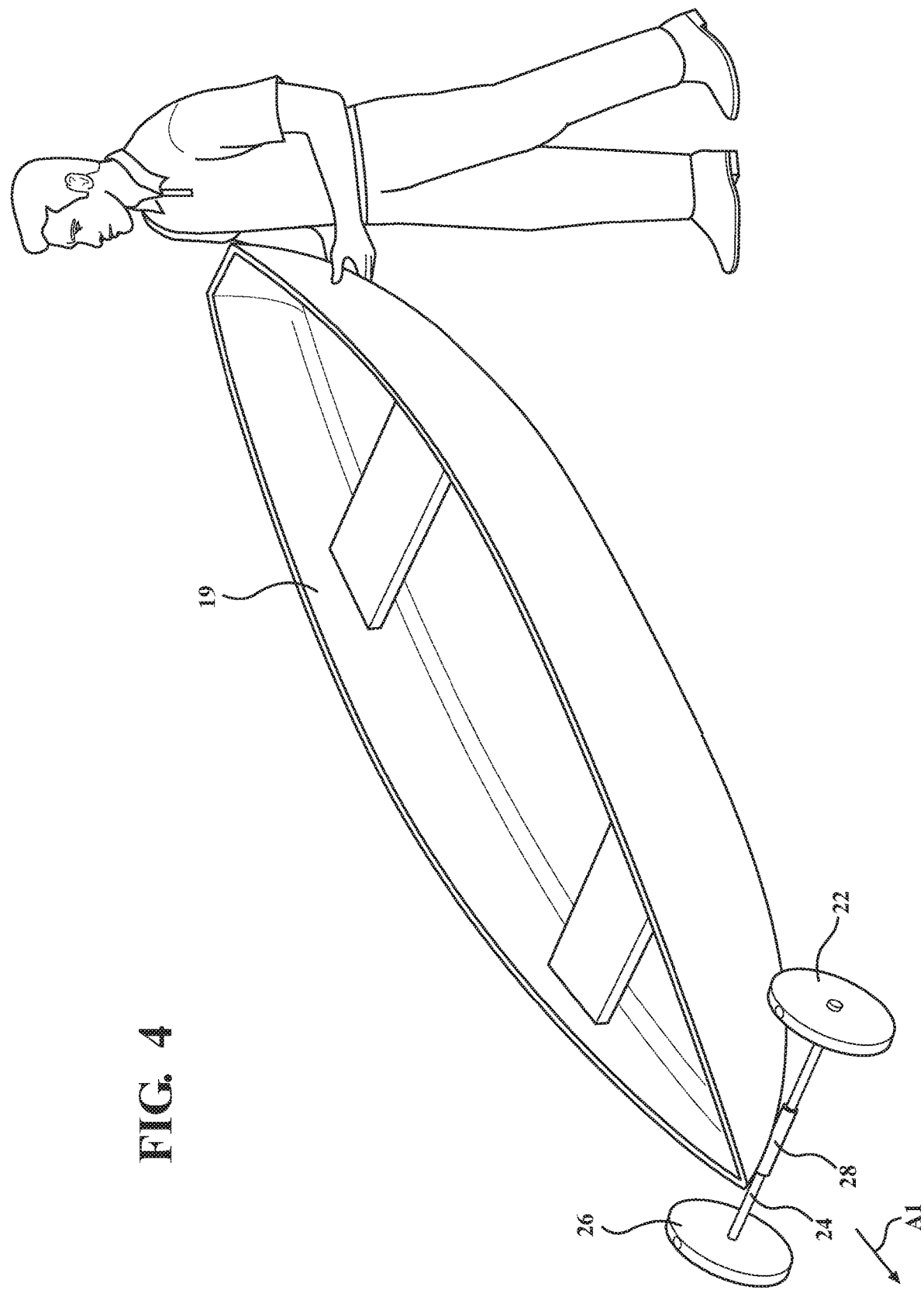
FIG. 4 is a schematic perspective view of a watercraft being transported by a user using a reconfigured oar in accordance with an embodiment described herein.

Embodiments described herein relate to a recreational watercraft accessory which serves as both a propulsion device and a transportation mechanism. In one aspect, an oar is provided for use in propelling the watercraft through water. The oar includes a first circular paddle portion, a second circular paddle portion, and a handle portion having a first end and a second end opposite the first end. An edge hole extends into an edge of the first paddle portion, and another edge hole extends into an edge of the second paddle portion. To form the oar, the handle portion first end is detachably securable in the first paddle portion edge hole and the handle portion second end is detachably securable in the second paddle portion edge hole. The first circular paddle portion, second circular paddle portion, and handle portion may also be reconfigured from the oar into a mechanism to aid in transporting the watercraft along a ground surface. For this purpose, the first circular paddle portion has a center hole, and the handle portion first end is detachably securable in the first paddle portion center hole. Also, the second circular paddle portion has a center hole, and the handle portion second end is detachably securable in the second paddle portion center hole. A length of the handle portion between the ends may be mounted in a sleeve secured to a portion of the watercraft. When the handle portion is mounted in the sleeve, the handle portion first end is secured in the first paddle portion center hole, and the handle portion second end is secured in the second paddle portion center hole, the handle portion serves as an axle and the paddle portions serve as wheels mounted on the axle. This enables the watercraft to be rolled across a ground surface.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. Unless otherwise noted, similar reference characters are used to describe similar features on separate elements and/or embodiments. Any of the components described herein may be formed from a material (or materials) suitable for the purpose(s) of the component as described herein.

FIG. 1 is a schematic side view of an oar 20 in accordance with an embodiment described herein. Oar 20 may be used in a known manner for propelling a watercraft through water. As used herein, the term "watercraft" may include a boat (such as a canoe or a kayak) or other similar floatable vehicle which may be propelled through the water by manual exertion of an occupant using the oar.

Oar 20 may include a first circular paddle portion 22 having an edge 22a. An edge hole 22b may extend into the edge 22a of the first paddle portion 22. First paddle portion edge hole 22b may be structured to receive therein a first end 24a of a handle portion 24, as described herein. Oar 20 may also include a second circular paddle portion 26 having an edge 26a. An edge hole 26b may extend into the edge 26a of the second paddle portion 26. Second paddle portion edge hole 26b may be structured to receive therein a second end 24b of the handle portion 24, as described herein.

First and second paddle portions 22, 26 are circular so that the paddle portions may function both as the ends of a paddle to aid in propelling a watercraft through the water, and also as wheels which may be rotatably secured or coupled to the watercraft to suspend a portion of the watercraft above a ground surface G1 and enable the watercraft to be rolled along the ground surface.

In one or more arrangements, the first paddle portion edge hole 22b is a threaded edge hole and the second paddle portion edge hole 26b is a threaded edge hole. The first circular paddle portion 22 may further include a threaded center hole 22c extending through a center of the first paddle portion 22. The second circular paddle portion 26 may also further include a threaded center hole 26c extending through a center of the second paddle portion 26.

Referring to FIG. 1, in one or more arrangements, the first paddle portion threaded center hole 22c and the first paddle portion edge hole 22b are structured so that a central axis X1 of the first paddle portion threaded center hole 22c substantially intersects a central axis X2 of the first paddle portion edge hole 22b. In one or more arrangements, the second paddle portion threaded center hole 26c and the second paddle portion edge hole 26b are structured so that a central axis X3 of the second paddle portion threaded center hole 26c substantially intersects a central axis X4 of the second paddle portion edge hole 26b. "Substantially intersects" means that the central axis of the paddle portion threaded center hole either contacts the central axis of the paddle portion edge hole or passes within a predetermined distance from the central axis of the first paddle portion edge hole. The predetermined distance may be determined by manufacturing tolerances for the center hole and the edge hole, for example. In one example, the predetermined distance is two inches.

The handle portion 24 may connect the first and second paddle portions 22, 26. In one or more arrangements, the handle portion 24 may be straight. Alternatively, the handle portion 24 may have any shape suitable for the purposes described herein.

FIG. 1 shows an embodiment of the oar 20 in an assembled condition for use in propelling a watercraft through the water. As shown in FIG. 1, the first paddle portion edge hole 22b and the handle portion first end 24a may be structured so that the handle portion first end is detachably securable in the first paddle portion edge hole 22b when the handle portion first end 24a is received in the first paddle portion edge hole 22b. Also, the second paddle portion edge hole 26b and the handle portion second end 24b may be structured so that the handle portion second end 24b is detachably securable in the second paddle portion edge hole 26b when the handle portion second end 24b is received in the second paddle portion edge hole.

In one or more arrangements, the handle portion first end 24a may be a threaded first end. Also, the handle portion second end 24b may be a threaded second end. In addition, the handle portion threaded first end 24a may be structured to threadedly engage the first paddle portion threaded center hole 22c to detachably secure the handle portion threaded first end 24a to the first paddle portion 22. Also, the handle portion threaded second end 24b may be structured to threadedly engage the second paddle portion threaded center hole 26c to detachably secure the handle portion threaded second end 24b to the second paddle portion 26.

In one or more arrangements, in an embodiment where the first paddle portion edge hole 22b is a threaded edge hole, the handle portion threaded first end 24a may be structured to threadedly engage the first paddle portion threaded edge hole 22b to detachably secure the handle portion first end 24a to the first paddle portion 22. Also, in an embodiment where the second paddle portion edge hole 26b is a threaded edge hole, the handle portion threaded second end 24b may be structured to threadedly engage the second paddle portion threaded edge hole 26b to detachably secure the handle portion second end 24b to the second paddle portion 26.

FIG. 2 is a schematic perspective exploded view of the oar 20 of FIG. 1 showing reconfiguration of the oar to an axle and wheels which may be rotatably coupled or secured to the watercraft (shown as element 19) to enable the watercraft to be rolled across a ground surface. This feature eases transport of the watercraft 19, which may otherwise be too heavy or bulky for a user to move.

To reconfigure oar 20, handle portion first and second ends 24a, 24b are detached from first and second paddle portions 22 and 26. For example, where the handle portion 24 is threadedly attached to the first and second paddle portions 22, 26, the first and second ends 24a, 24b of the handle portion 24 may be unscrewed from the respective first and second paddle portion edge holes 22b, 26b.

When the oar 20 has been disassembled, the handle portion 24 may serve as an axle and the paddle portions 22, 26 may be attached to the handle portion 24 to serve as wheels of a mechanism enabling the watercraft to be rolled across a ground surface. For this purpose, a mounting sleeve 28 may be attached to the watercraft 19 along the bow 19a. The sleeve 28 may be structured to receive the handle portion 24 in an opening of the sleeve in a loose sliding fit, so that the handle portion 24 can freely rotate within the cavity 28a defined by the sleeve 28 while being supported in the sleeve. If desired, one or more suitable bearing(s) (not shown) may be mounted in the sleeve 28 to facilitate rotation of the handle portion 24 with respect to the sleeve 28. The handle portion 24 may then be inserted into the bearings. The sleeve 28 may be attached to the watercraft 19 by any suitable method, such as mechanical fasteners or adhesive application.

The sleeve 28 may be attached to the watercraft bow 19a at a location where the bow will be supported and spaced above the ground surface G1 at least a predetermined distance R1 (FIG. 3) when the handle portion/axle 24 and paddle portions/wheels 22, 26 are mounted in the sleeve 28 and the during rolling of the watercraft 19 across the ground surface G1 by a user, as described herein. In one or more arrangements, outwardly-facing surfaces of the sleeve may be padded or cushioned with a foam or rubber-like material, thereby enabling the sleeve to serve as a bumper for the watercraft when the craft is in the water.

Handle portion 24 may be inserted into the sleeve cavity 28a to mount the handle portion 24 in the sleeve, so that the handle portion first end 24a extends to one side of the sleeve 28 and bow 19a, and handle portion second end 24b extends to an opposite side of the sleeve 28 and bow 19a. The paddle portions 22, 26 may then be mounted on respective handle portion ends 24a, 24b using the paddle portion threaded center holes 22c, 26c. The distance R1 may depend on the ground clearance desired during movement of the watercraft. The attachment location of the sleeve 28 to the watercraft may depend on the particular watercraft design and other pertinent factors. A central longitudinal axis X5 of the handle portion/axle 24 may define a rotational axis of the handle portion/axle 24 and paddle portions/wheels 22, 26 as mounted on the watercraft 19.

In one or more arrangements, the threads in the first paddle portion threaded center hole 22c and the threads on the handle portion/axle first end 24a may be structured so that the respective threads are threadedly engaged by any of rotation of the first paddle portion 22 with respect to the handle portion threaded first end 24a in a first rotational direction D1 about the rotational axis X5, and rotation of the handle portion threaded first end 24a with respect to the first paddle portion 22 in a second rotational direction D2 about the rotational axis X5, where second rotational direction D2 is opposite the first rotational direction D1. This configuration of the threads ensures that, if the first paddle portion 22 "skids" or drags across the ground surface G1 when the watercraft 19 is moved in direction "A1" across the ground surface G1, the resulting frictional force acting on the first paddle portion 22 will tend to tighten the connection between the first paddle portion 22 and the handle portion first end 24a, rather than unscrewing the first paddle portion 22 from the handle portion first end 24a. Stated another way, when the watercraft 19 is being moved in direction "A1", the first paddle portion 22 is always rotating in a direction that tends toward increased engagement or tightening between the first paddle portion center hole threads and the handle portion first end threads. This may aid in preventing disengagement of the first paddle portion 22 from the handle portion first end 24a during rolling of the watercraft 19.

Similarly, in one or more arrangements, the threads in the second paddle portion threaded center hole 26c and the threads on the handle portion/axle second end 24b may be structured so that the respective threads are threadedly engaged by any of rotation of the second paddle portion 26 with respect to the handle portion threaded second end 24b in the first rotational direction D1 about the rotational axis X5, and rotation of the handle portion threaded second end 24b with respect to the second paddle portion 26 in the second rotational direction D2 about the rotational axis X5. This configuration of the threads ensures that, if the second paddle portion 26 "skids" or drags across the ground surface G1 when the watercraft 19 is moved in direction "A1", the resulting frictional force acting on the second paddle portion 26 will tend to tighten the connection between the second paddle portion 26 and the handle portion second end 24b, rather than unscrewing the second paddle portion 26 from the handle portion second end 24b. Stated another way, when the watercraft 19 is being moved in direction "A1" across the ground surface G1, the second paddle portion 26 is always rotating in a direction that tends toward increased engagement or tightening between the second paddle portion center hole threads and the handle portion second end threads. This may aid in preventing disengagement of the second paddle portion 26 from the handle portion second end 24b during rolling of the watercraft 19.

Caps 30 may be provided for covering and sealing the paddle portion edge holes 22b, 26b when the paddle portions 22, 26 are used as wheels. In one or more arrangements, each cap 30 may have a threaded portion 30a structured to threadedly engage an associated threaded version of a respective paddle portion edge hole to cover and seal the hole, helping to prevent entry of dirt and mud into the paddle portion edge holes 22b, 26b when the holes are not occupied by respective ends of the handle portion 24.

In the above detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of ... and ... " as used herein refers to and encompasses any and all possible combinations of one or more of the associated listed items. As an example, the phrase "at least one of A, B and C" includes A only, B only, C only, or any combination thereof (e.g. AB, AC, BC or ABC).

Aspects herein can be embodied in other forms without departing from the spirit or essential attributes thereof. Accordingly, reference should be made to the following claims, rather than to the foregoing specification, as indicating the scope of the invention.

What is claimed is:

1. An oar for use in propelling a watercraft through water, the oar comprising:
    a first circular paddle portion;
    a threaded edge hole extending into an edge of the first paddle portion;
    a second circular paddle portion;
    a threaded edge hole extending into an edge of the second paddle portion; and
    a handle portion having a threaded first end and a threaded second end opposite the first end, the threaded first end being structured to threadedly engage the first circular paddle portion threaded edge hole to detachably secure the handle portion first end to the first paddle portion, the threaded second end being structured to threadedly engage the second circular paddle portion threaded edge hole to detachably secure the handle portion second end to the second paddle portion,
    wherein the first circular paddle portion further comprises a threaded center hole extending through a center of the first paddle portion, wherein the second circular paddle portion further comprises a threaded center hole extending through a center of the second paddle portion, wherein the handle portion threaded first end is structured to threadedly engage the first paddle portion threaded center hole to detachably secure the handle portion threaded first end to the first paddle portion, and wherein the handle portion threaded second end is structured to threadedly engage the second paddle portion threaded center hole to detachably secure the handle portion threaded second end to the second paddle portion.

2. The oar of claim 1 wherein the handle portion defines a rotational axis, wherein the handle portion threaded first end is structured to threadedly engage the first paddle portion threaded center hole by any of rotation of the first paddle portion with respect to the handle portion threaded first end in a first rotational direction about the rotational axis, and rotation of the handle portion threaded first end with respect to the first paddle portion in a second rotational direction about the rotational axis opposite the first rotational direction, and
    wherein the handle portion threaded second end is structured to threadedly engage the second paddle portion threaded center hole by any of rotation of the second paddle portion with respect to the handle portion threaded second end in the first rotational direction about the rotational axis, and rotation of the handle portion threaded second end with respect to the second paddle portion in the second rotational direction about the rotational axis.

3. The oar of claim 1 wherein the first paddle portion threaded center hole and the first paddle portion edge hole are structured so that a central axis of the first paddle portion threaded center hole substantially intersects a central axis of the first paddle portion edge hole.

4. The oar of claim 3 wherein the second paddle portion threaded center hole and the second paddle portion edge hole are structured so that a central axis of the second paddle portion threaded center hole substantially intersects a central axis of the second paddle portion edge hole.

5. The oar of claim 1 further comprising a first paddle portion edge hole cover structured to be detachably securable to the first paddle portion to seal the first paddle portion edge hole.

\* \* \* \* \*